US008184564B2

(12) United States Patent
Kinder et al.

(10) Patent No.: US 8,184,564 B2
(45) Date of Patent: May 22, 2012

(54) STAGGERING BURSTS OF BROADCAST MANAGEMENT FRAMES IN A WIRELESS NETWORK DEVICE HAVING A PLURALITY OF MAC ADDRESSES

(75) Inventors: Richard D. Kinder, Eastwood (AU); Douglas A. Smith, Stouffville (CA)

(73) Assignee: Cisco Technology, Inc., San Jose, CA (US)

( * ) Notice: Subject to any disclaimer, the term of this patent is extended or adjusted under 35 U.S.C. 154(b) by 1777 days.

(21) Appl. No.: 11/356,611

(22) Filed: Feb. 17, 2006

(65) Prior Publication Data

US 2007/0195727 A1    Aug. 23, 2007

(51) Int. Cl.
*H04B 7/00* (2006.01)
*G08C 17/00* (2006.01)
*H04W 4/00* (2009.01)

(52) U.S. Cl. .......................... 370/311; 370/310; 370/329

(58) Field of Classification Search .................. 370/229, 370/235, 310, 311, 431
See application file for complete search history.

(56) References Cited

U.S. PATENT DOCUMENTS

| | | | | |
|---|---|---|---|---|
| 6,366,622 | B1 * | 4/2002 | Brown et al. | ................. 375/322 |
| 2001/0002822 | A1 * | 6/2001 | Watters et al. | ............. 342/357.1 |
| 2004/0147272 | A1 * | 7/2004 | Shiota et al. | .................. 455/502 |
| 2004/0196812 | A1 * | 10/2004 | Barber | .......................... 370/334 |
| 2005/0089045 | A1 * | 4/2005 | Shim et al. | ............... 370/395.42 |
| 2005/0286446 | A1 * | 12/2005 | Barber | .......................... 370/278 |
| 2006/0072628 | A1 * | 4/2006 | Liu et al. | ........................ 370/516 |

OTHER PUBLICATIONS

ANSI/IEEE, "ANSI IEEE Std. 802.11 IEEE Standard for Information technology Telecommunications and information exchange between systems Local and metropolitan area networks Specific requirements Part 11: Wireless LAN Medium Access Control (MAC) and Physical Layer (PHY) Specifications", 1999 edition.*

* cited by examiner

*Primary Examiner* — Ayaz Sheikh
*Assistant Examiner* — Tarell Hampton
(74) *Attorney, Agent, or Firm* — Dov Rosenfeld; INVENTEK (57) ABSTRACT

A method, a software product, and an apparatus to operate in a wireless device of a wireless network. The wireless device acts as a plurality of APs. The method includes transmitting bursts of management frames containing a broadcast-buffered indication for a corresponding subset of network identifiers of the wireless device, and transmitting bursts of management frames not containing any broadcast-buffered indication. The broadcast-buffered indication indicates that broadcast data is buffered at the AP of the device. Thus, management frames are sent in bursts, and the burst are staggered to reduce the likelihood that two bursts of management frames containing a broadcast-buffered indication are transmitted in immediate succession.

37 Claims, 4 Drawing Sheets

STAGGERING BURSTS OF BROADCAST MANAGEMENT FRAMES IN A WIRELESS NETWORK DEVICE HAVING A PLURALITY OF MAC ADDRESSES

RELATED PATENT APPLICATIONS

This invention is related to co-pending U.S. patent application Ser. No. 11/116,543 filed 28 Apr. 2005 to inventor Kinder, titled DETERMINING BROADCAST MESSAGE TRANSMIT TIMES FOR A WIRELESS DEVICE HAVING A PLURALITY OF WLAN MAC ADDRESSES, Ref/Docket No. CISCO10812. The contents of U.S. patent application Ser. No. 11/116,543 are incorporated herein by reference.

BACKGROUND

The present invention relates to wireless networks, and in particular to an apparatus, and to a method of transmitting beacon frames from a wireless device capable of supporting a plurality of MAC addresses such that the wireless device can function as a plurality of access points in a wireless network.

Wireless networks, in particular wireless local area networks (WLANs) such as those conforming to the IEEE 802.11 standard are becoming widely used. In a wireless network that acts in infrastructure mode, one wireless device acts as an access point (AP)— also called a base station—to a set of client stations, and all communication to and from a client station via the access point to which the client is associated.

A new feature being developed for wireless devices is the ability for a single wireless device to act as multiple "virtual" access points, each for a different infrastructure wireless network. Thus, a single wireless device can act as an access point, also called a base station for a plurality of infrastructure networks. Each infrastructure network is identified by a network identifier. In the language of the IEEE 802.11 standard, each infrastructure network is called a basic service set (BSS), and the network identifier is a basic service set identifier (BSSID). For an AP, the BSSID is the MAC address of the AP. Thus, a single wireless device can have a plurality of MAC addresses.

An AP indicates its availability by broadcasting beacon frames. For a wireless device to act as more than a single AP, that is, to act as a multiple BSSID AP (MBSSID-AP) device, the wireless device needs to be able to broadcast multiple beacons spread across a beacon period, each beacon indicating that the broadcasting device has a different BSSID.

To a client station, an MBSSID-AP appears to be several distinct co-located APs.

Power Save Mode in WLANS

It is known for a wireless client of an infrastructure WLAN to work in power save mode, wherein the AP of the client notes which client is in "sleep" ("power save") mode, and buffers packets for clients in sleep mode. An indication by an AP to one or more particular clients that data is buffered for the client(s), called a traffic indication map element (TIM) in the case of the IEEE 802.11 standard, is used to make it possible for the AP to announce which client stations have data buffered. The TIM is sent with every beacon from the AP. Client stations that are in power save mode periodically wake up and listen for beacons. Thus, an AP broadcasts frames containing indications to particular client(s) that data is buffered for the client(s) in the AP.

A client receiving a TIM interprets the TIM to determine if unicast and multicast traffic is buffered on the AP for the client. A client station, once it determines that unicast data is buffered at the AP, transmits a short poll frame (a PS-Poll) to the AP, and the AP of the client station responds with the corresponding buffered unicast data, or acknowledges receipt of the poll and sends the buffered unicast data at a later time.

If the TIM indicating that data is buffered is sent during a contention-free period (CFP), a contention-free pollable client station operating in sleep mode does not send the short PS-Poll frame, but rather remains active until the buffered data is received, or until the CFP ends.

In addition to unicast traffic for a client station, there may be broadcast or multicast traffic buffered for client stations. On the AP side, if any client station is in sleep mode, the AP buffers all broadcast and multicast traffic. The AP periodically broadcasts a frame—a beacon frame—that includes an indication that broadcast or multicast traffic is buffered in the AP. We call such an indication a broadcast-buffered indication. In the case of the IEEE 802.11 standard, the indication is called a delivery traffic indication map element (DTIM). Thus, an AP periodically transmits a beacon containing a DTIM. The AP then delivers any multicast or broadcast traffic that is buffered to all clients immediately following transmission of the DTIM-containing beacon.

Recall a TIM identifies the client stations for which traffic is pending and buffered in the AP, and this is coded in a partial virtual bitmap. In addition, the TIM contains an indication of whether multicast/broadcast traffic is buffered. While an AP sends a TIM with every beacon, a DTIM rather than an ordinary TIM is transmitted within a beacon every period called a DTIM period. After transmitting a DTIM, an AP sends out any buffered broadcast or multicast traffic using normal frame transmission rules.

Thus, unicast traffic is obtained by the client via a PS-Poll, and multicast traffic destined to the clients in the BSSID is transmitted at the DTIM beacon boundary.

In an 802.11 WLAN, a timing synchronization function (TSF) keeps the timers for all stations in the same infrastructure network synchronized. The AP is the timing master and performs the TSF. Each station maintains a local TSF timer. Each client station's TSF timer keeps running even when stations are sleeping.

Power Save Mode for APs in a Device Supporting Multiple BSSIDs

With a single wireless device able to act as different APs for different sets of client stations, e.g., a single device having multiple BSSID's, problems arise if the individual beacon DTIM periods overlap between different infrastructure networks. As an example, consider the case of a single wireless device acting as the AP of seven BSSs. The wireless device thus has seven corresponding BSSIDs, each with a DTIM period. Suppose the DTIM period was 2.

In the following, denote by B(n) a regular beacon frame for the device acting as AP with a BSSID denoted n, n=1, 2, . . . , 7, and denote by D(n) a beacon frame containing a DTIM for the wireless device acting as AP with the BSSID n, n=1, 2, 3, . . . , 7.

In a multiple BSS wireless networks with a single device acting as multiple access points providing multiple BSSs by transmitting multiple beacons, there are two main methods when transmitting multiple beacons.

A first method includes transmitting the beacons in rapid succession at the TBTT. We call this "burst beacon transmission" and simply "bursting" beacons. With this method, the order of transmission is:

B(1) B(2) B(3) B(4) . . . B(7) . . . D(1) D(2) D(3) D(4) . . . D(7) . . .

This is undesirable because there is a cluster of DTIM beacons happening one after the other.

The second method includes transmitting the beacons spread out across the entire beacon period. We call this "staggered beacon transmission" and simply "staggering" beacons. For a beacon period denoted Period_beacon time units, in a device with a number denoted Num_BSSID BSSIDs, a device transmits a beacon every "delta beacon time", denoted delta_b, with delta_b=Period_beacon/Num_BSSID time units. Each beacon has a Target Beacon Transmission Time (TBTT), the time instant at which the access point schedules the next beacon message. Thus, for the device transmitting staggered beacons, TBTT is offset by Period_beacon/Num_BSSID from the previous beacon.

Each method has its advantage(s). Bursting beacons has the advantage that the beacons can be transmitted at a smaller inter-frame gap and use less bandwidth transmitting the beacons compared to staggering beacons. Staggering beacons has the advantage that there is time between successive beacons for buffered multicast traffic to be transmitted. See above-referenced U.S. patent application Ser. No. 11/116,543 for details of staggering beacons.

Each of the known methods also has its disadvantages. Bursting beacons has the disadvantage that for a relatively large numbers of BSSs, buffered multicast traffic to be transmitted after the DTIM beacon may overlap across different BSSs, and potentially cause large delays for other traffic classes, including VOIP. Staggering beacons was developed to overcome this disadvantage of bursting, but has the disadvantage that each beacon must be transmitted using normal medium access rules, and furthermore, must be transmitted over the whole beacon period, so may use more air-time than simply bursting all beacons at once.

Thus there is a need in the art for a method that has the advantages of both staggering and bursting beacons.

SUMMARY

Aspects of the present invention combine the advantages of two types of beacon transmission for multiple BSS devices: bursting beacons and staggering beacons. The main advantage of bursting beacons is all beacons are transmitted in rapid succession to each other, reducing contention and medium overheads. With staggering beacons, there is more air-time between beacons to allow for deferred multicast/broadcast packets when power save is enabled for a given BSS.

An aspect of the present invention includes a combination of staggering and bursting, so that good non-beacon air-time and good power save multicast throughput are provided. One implementation includes, compared to only staggering or only bursting, reducing air-time to transmit beacons, and allowing more time between beacon bursts for potential buffered multicast traffic.

Combining both beacon bursting and staggering allows the strengths of both methods to be simultaneously used. Compared to only staggering or only bursting, air-time is reduced by bursting beacons in groups, so less medium contention is involved. Furthermore, network behavior is "smoother" as a result of the DTIM periods for different BSSs being staggered across the whole beacon period.

Described herein is a method for staggering and bursting beacons in a multiple BSSID wireless network device, a wireless device apparatus that includes aspects of the present invention for managing a plurality of BSSIDs, and a carrier medium carrying instructions that when executed by one or more processors, cause the processor(s) to carry out the method for staggering and bursting beacons in a multiple BSSID wireless network device.

One aspect is a method in a wireless device of a wireless network. The wireless network provides for access points to transmit management frames, e.g., beacon frames, including management frames that contain a broadcast-buffered indication to indicate that there is broadcast or multicast traffic buffered in the access point transmitting the management frame. For example, the wireless network provides for sending beacon frames containing a DTIM. The wireless device supports a plurality of network identifiers, e.g., BSSIDs so that the device can act as a plurality of access points in the wireless network. In one aspect, the method includes: transmitting bursts of management frames, each frame containing a broadcast-buffered indication for a corresponding subset of network identifiers of the wireless device that are active in the wireless network; and transmitting bursts of management frames not containing any broadcast-buffered indication.

The bursts of management frames containing a broadcast-buffered indication are spread interleaved with bursts of management frames not containing any broadcast-buffered indication, across the time period between successive management frames containing a broadcast-buffered indication of any one of the pluralities of network identifiers active in the wireless device. The spreading reduces the likelihood that two bursts of management frames containing a broadcast-buffered indication are transmitted in immediate succession to increase the likelihood that there is sufficient time to broadcast/multicast any buffered data from an access point of the wireless device immediately after a burst of management frames containing a broadcast-buffered indication is transmitted.

One aspect further is a method of transmitting a plurality of management frames for a corresponding plurality of network identifiers of a wireless network. The method is in a wireless device that supports the plurality of network identifiers and that acts as an access point for each of the plurality of network identifiers. The network device is in the wireless network and includes a transmitter. The method includes transmitting staggered bursts of pluralities of management frames for corresponding subsets of the network identifiers.

The transmitting includes, for all subsets of the network identifiers, transmitting a burst of management frames, each particular management frame in the burst including a broadcast-buffered indication indicating that there is broadcast or multicast traffic buffered in the access point of the network identifier of the particular management frame, wherein the bursts of management frames containing a broadcast-buffered indication for each access point of the wireless device are transmitted by the wireless device at times spread substantially evenly, interleaved with bursts of other management frames not containing any broadcast-buffered indication. Thus, the transmitting of successive bursts of management frames containing a broadcast-buffered indication are staggered such that it is relatively unlikely that two bursts of management frames containing a broadcast-buffered indication are transmitted in succession by the wireless device to ensure that the wireless device has sufficient time to broadcast/multicast data buffered immediately after a burst of management frames containing a broadcast-buffered indication is transmitted.

One aspect further is a computer-readable carrier medium carrying instructions that, when executed by one or more processors of a processing system, cause the processing system to carry out a method in a wireless device of a wireless network. The wireless network provides for access points to transmit management frames, including management frames that contain a broadcast-buffered indication to indicate that there is broadcast or multicast traffic buffered in the access point transmitting the management frame. The wireless device supports a plurality of network identifiers so that the device can act as a plurality of access points in the wireless network. The method includes: transmitting bursts of management frames, each frame containing a broadcast-buffered indication for a corresponding subset of network identifiers of the wireless device that are active in the wireless network; and transmitting bursts of management frames not containing any broadcast-buffered indication.

The bursts of management frames containing a broadcast-buffered indication are spread interleaved with bursts of management frames not containing any broadcast-buffered indication, across the time period between successive management frames containing a broadcast-buffered indication of any one of the pluralities of network identifiers active in the wireless device. The spreading reduces the likelihood that two bursts of management frames containing a broadcast-buffered indication are transmitted in immediate succession to increase the likelihood that there is sufficient time to broadcast/multicast any buffered data from an access point of the wireless device immediately after a burst of management frames containing a broadcast-buffered indication is transmitted.

One aspect further is an apparatus in a wireless device of a wireless network. The wireless network providing for access points to transmit management frames, including management frames that contain a broadcast-buffered indication to indicate that there is broadcast or multicast traffic buffered in the access point transmitting the management frame. The wireless device supports a plurality of network identifiers so that the device can act as a plurality of access points in the wireless network. The apparatus includes means for transmitting. The means for transmitting is arranged to transmit bursts of management frames, each frame containing a broadcast-buffered indication for a corresponding subset of network identifiers of the wireless device that are active in the wireless network. The means for transmitting is further arranged to transmit bursts of management frames not containing any broadcast-buffered indication, such that the bursts of management frames containing a broadcast-buffered indication are spread interleaved with bursts of management frames not containing any broadcast-buffered indication, across the time period between successive management frames containing a broadcast-buffered indication of any one of the pluralities of network identifiers active in the wireless device, and such that the spreading reduces the likelihood that two bursts of management frames containing a broadcast-buffered indication are transmitted in immediate succession to increase the likelihood that there is sufficient time to broadcast/multicast any buffered data from an access point of the wireless device immediately after a burst of management frames containing a broadcast-buffered indication is transmitted.

Yet another aspect is also an apparatus in a wireless device of a wireless network. The wireless network provides for access points to transmit management frames, including management frames that contain a broadcast-buffered indication to indicate that there is broadcast or multicast traffic buffered in the access point transmitting the management frame. The wireless device supports a plurality of network identifiers so that the device can act as a plurality of access points in the wireless network. The apparatus includes a transceiver, and control logic coupled to the transceiver.

The control logic is arranged to cause the transceiver to transmit bursts of management frames, each frame containing a broadcast-buffered indication for a corresponding subset of network identifiers of the wireless device that are active in the wireless network.

The control logic further is arranged to cause the transceiver to transmit bursts of management frames not containing any broadcast-buffered indication, such that the bursts of management frames containing a broadcast-buffered indication are spread interleaved with bursts of management frames not containing any broadcast-buffered indication, across the time period between successive management frames containing a broadcast-buffered indication of any one of the pluralities of network identifiers active in the wireless device, and such that the spreading reduces the likelihood that two bursts of management frames containing a broadcast-buffered indication are transmitted in immediate succession to increase the likelihood that there is sufficient time to broadcast/multicast any buffered data from an access point of the wireless device immediately after a burst of management frames containing a broadcast-buffered indication is transmitted.

DETAILED DESCRIPTION

Described herein is a method for staggering and bursting beacons in a multiple BSSID wireless network device, a wireless device apparatus that including aspects of the present invention for managing a plurality of BSSIDs, and a carrier medium carrying instructions that when executed by one or more processors, cause the processor(s) to carry out the method for staggering and bursting beacons in a multiple BSSID wireless network device.

An Exemplary Network and a Network Wireless Device

Figure 1:
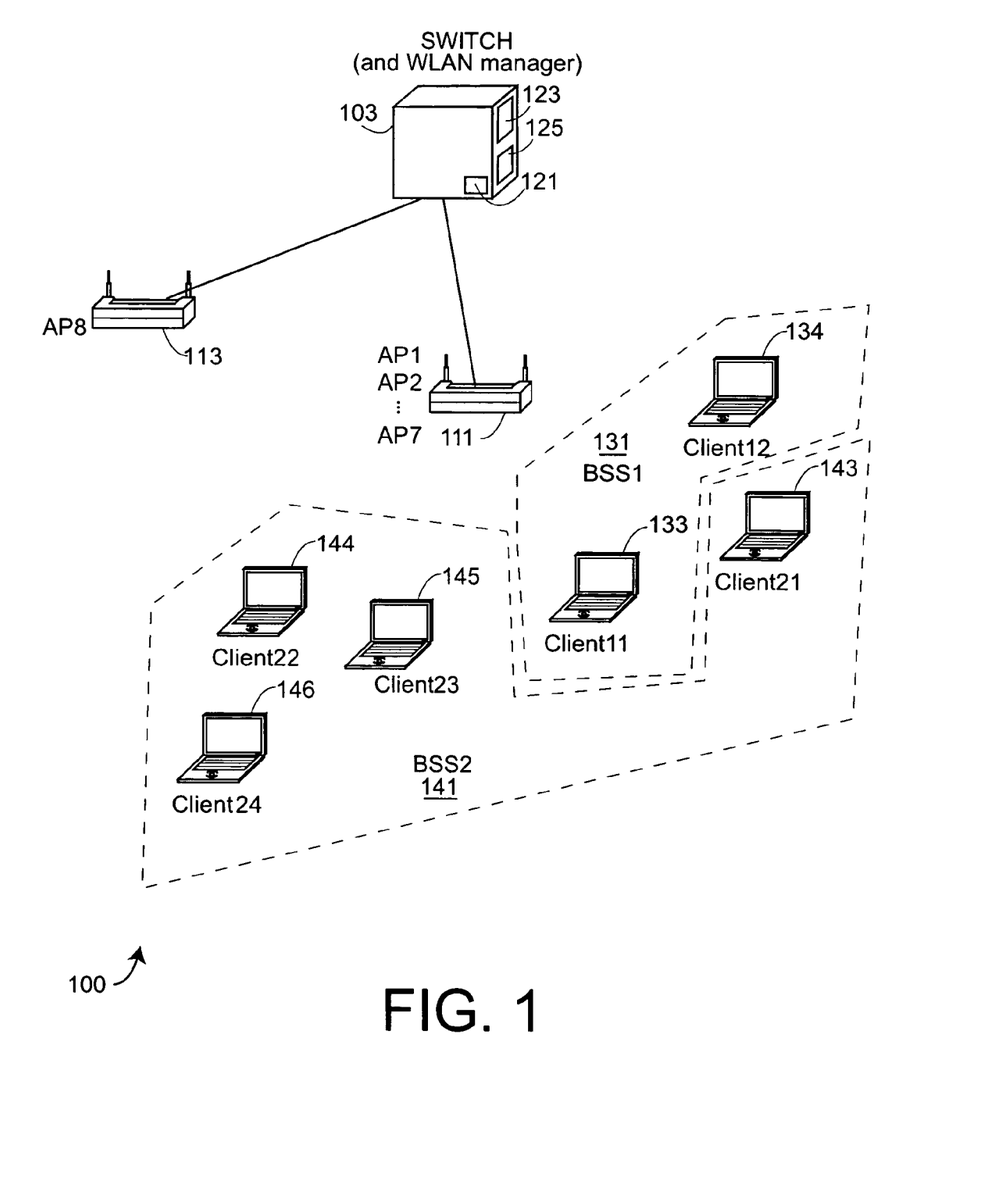
FIG. 1 shows part of an exemplary wireless network 100 that includes a wireless device that has at least two MAC addresses, that acts as two access points, and that includes an embodiment of the present invention.

FIG. 1 shows part of an exemplary network 100. A set of wireless devices acting as APs—two devices, 111 and 113—are shown coupled to a network device 103. The network device, for example may include a switch. Device 111 has seven basic service sets, respectively denoted BSS1, BSS2, . . . , BSS7 and that have a BSSID denoted BSSID1, BSSID2, . . . , BSSID7, respectfully. Wireless device 111 thus acts as seven APs, denoted AP1, AP2, . . . , AP7. In this description, the wireless device 111 includes an embodiment of the present invention. Device 113 is denoted as AP8.

The network device 103 may also perform other functions, e.g., network device 103 may act as a switch 103 and may also act as a WLAN manager managing such aspects as security and the setting of radio parameters. For the remainder of the description, the device 103 is assumed to be a switch. The coupling of the wireless devices 111 and 113 to the switch 103 may be direct, or via a network. In one embodiment, the coupling is via a fast network such as a Gigabit Ethernet.

Two of the seven BSSs of device 111 are shown. BSS1, shown with reference numeral 131, is managed by AP1 of wireless device 111 with BSSID1, and includes client stations 133 and 134, respectively denoted Client11 and Client12. BSS2, shown with reference numeral 141, is managed by AP2 of wireless device 111 with BSSID2, and includes client stations 143, 144, 145, and 146, respectively denoted Client21, Client22, Client23, and Client24. While the drawing shows two of the seven BSSIDs that the device 111 supports, those in the art will understand the general structure of the other BSSIDs, and also that in general, a multiple-BSSID wireless device supports any number, denoted Num_BSSID, of BSSIDs.

The switch includes a switch processor 123 coupled to a switch memory 125. Part of the switch memory 125 includes code that causes the processor, in combination with hardware and/or software in wireless device 111, to implement aspects of the present invention.

Figure 2:
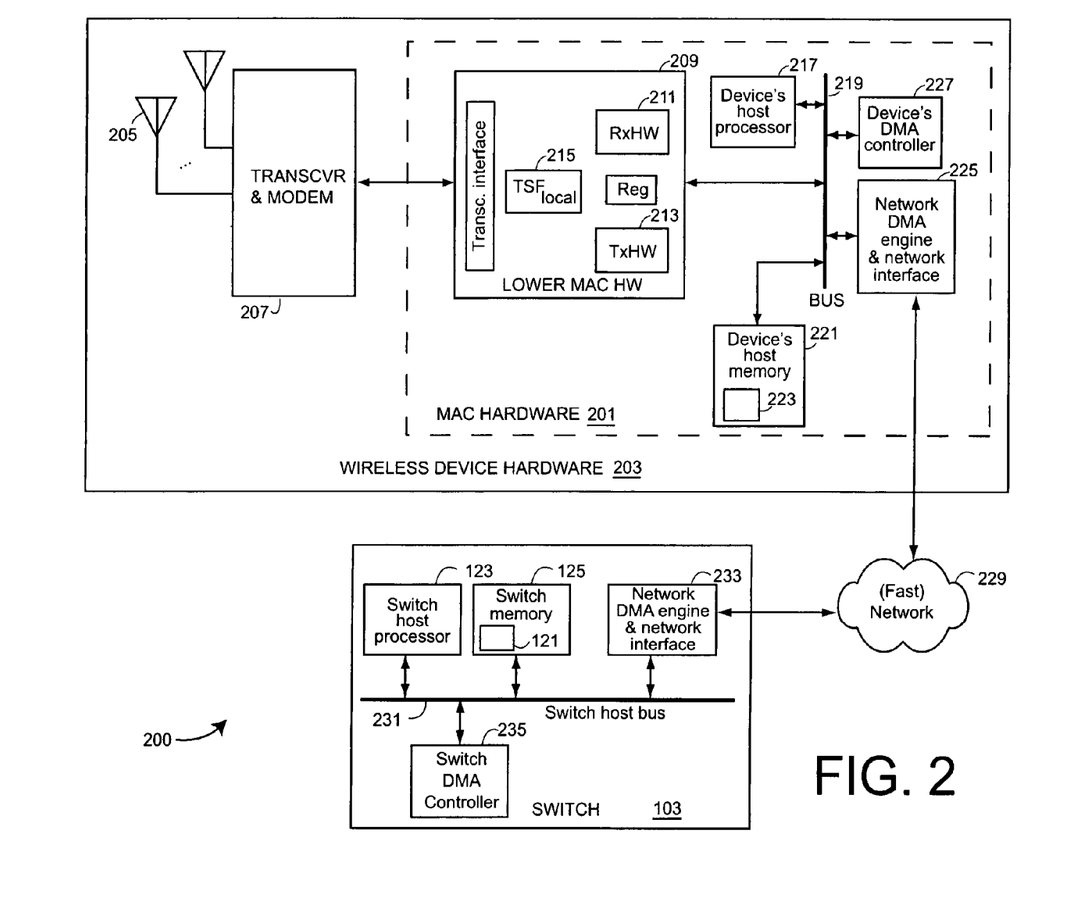
FIG. 2 shows a simplified block diagram of one embodiment of the hardware of a wireless device that includes aspects of the present invention for managing a plurality of BSSIDs.

FIG. 2 shows a simplified block diagram of one embodiment 200 of the hardware that operates wireless device 111, including aspects of the present invention for managing a plurality of BSSIDs. The hardware at the wireless device is shown as wireless device hardware 203, and is coupled to the switch 103. In one embodiment, part of the operation of the MAC is carried out at the switch 103, and other, lower function parts are carried out in the wireless device hardware 203. The coupling between the access point hardware 203 and switch 103 is via a fast, e.g., Gigabit Ethernet network 229.

The wireless device hardware 203 in one embodiment includes one or more antennas 205 for transmitting and receiving, coupled to a transceiver and modem 207 that receives MAC frames of information, and that transmits MAC frames. The transceiver and modem 207 is coupled to a MAC processor. In the embodiment shown, the functionality of the MAC processor is split between lower MAC hardware 209, a processing system on the wireless device hardware 203, and the switch 103. The transceiver and modem 207 is coupled to the lower MAC hardware 209 via a transceiver interface in the lower MAC hardware. The lower MAC hardware 209 includes receive MAC hardware 211, transmit MAC hardware 213, a local TSF clock 215 denoted $TSF_{local}$, and a register set for passing data. The wireless device hardware 203 is coupled to a wireless device processing system that includes a wireless device host processor 217 coupled via a bus subsystem 219 to a memory 221—the wireless device host memory. A DMA controller 227 deals with DMA transfers.

Those parts of the MAC processing that are based in the wireless device, including aspects of the present invention, are controlled by code 223 that is loaded into the wireless device's host memory 221.

For purposes of this description, the combination of the lower MAC hardware 209 and the wireless device processing system that include, e.g., the wireless device host processor 217 coupled via the bus subsystem 219 to the memory 221, is called the MAC hardware 201 herein, and is shown within a dashed line box in FIG. 2, recognizing of course that the wireless device processing system is used for other aspects of operating the wireless device, e.g., operating the device as a wireless station, and not having to do specifically with MAC processing.

In addition, aspects of the MAC processing, including aspects of the present invention, are carried out at the switch 103.

In one embodiment, the switch 103 includes a switch processing system that has a switch host processor 123, and switch memory 125 coupled to the host processor 123 via a bus subsystem 231. The switch 103 further includes a DMA controller 235 to set up DMA transfers to and from the switch memory 125. Some aspects of the present invention are in the form of code to instruct the processor 123 to carry out one or more steps of a method embodiment of the invention. Thus, aspects of the invention are in the form of code 121 carried in a carrier medium, e.g., memory 125. Furthermore, aspects of the invention may be in the form of a carrier medium that is split between the wireless device hardware 203 and the switch 103, e.g., as a combination of code 223 and code 121.

In the embodiment shown here, when the wireless device transmits, data is streamed from the switch memory 125 directly to the transmit hardware 213 during transmission via a fast network link as if there was no network present. Such streaming is controlled at the wireless device by a network DMA engine and network interface 225 that uses special frames to set up the streaming from the switch memory 125. At the switch, a switch network DMA engine and network controller 233 understands the special frames and uses the information therein to set up the DMA via the switch DMA controller 235. The DMA transfer itself also uses special frames that are formed at the switch's network DMA engine and network controller 233, and understood at the wireless device's network DMA engine and network controller 225.

Furthermore, during receive, in the embodiment shown herein, data is streamed directly into the switch memory 125 via the network 229 as if there was a direct, non-network connection. Such streaming is carried out also using the wireless devices' network DMA engine and network interface 225, and the switch's DMA engine and network interface 233, again using special frames for both setting up the DMA streaming and for streaming of the data itself.

The streaming aspects are described in co-pending U.S. Pending patent applications Ser. No. 10/724,559 filed Nov. 26, 2003 to Krischer, et al., titled "A METHOD AND APPARATUS TO PROVIDE DATA STREAMING OVER A NETWORK CONNECTION IN A WIRELESS MAC PROCESSOR", and No. 10/815,283 filed Mar. 31, 2004 to Krischer, et al., titled "METHOD AND APPARATUS TO PROVIDE INLINE ENCRYPTION AND DESCRIPTION FOR A WIRELESS STATION VIA DATA STREAMING OVER A FAST NETWORK," both assigned to the assignee of the present invention. The contents of both Applications Nos. 10/724,559 and 10/815,283 are incorporated herein by references for all purposes.

It should be noted that the present invention does not depend on any particular architecture of the wireless device used as the wireless device supporting multiple BSSIDs, or of the MAC processing therein. For example, the network link with the network DMA processors 225 at the wireless device and 233 at the switch can be replaced by non-network connections. Furthermore, in a more traditional architecture, the DMA transfers during transmit and receive can be from and to the wireless device host memory 221. Those in the art will recognize other architectures are possible.

Staggering and Bursting Beacon Frames

Aspects of the present invention will be explained using the exemplary AP 111 configured with Num_BSSID=7 BSSIDs, each with a beacon of size 128 bytes, with a beacon period of Period_beacon=140 ms, and a DTIM period, denoted Period_DTIM, of 2. Denote by B(n) a regular beacon frame for the device acting as and AP with a BSSID denoted n, n=1, 2, . . . , 7, and denote by D(n) a beacon frame containing a DTIM for the wireless device 111 acting as multi-BSSID AP with the BSSID n, n=1, 2, . . . , 7.

Consider first the pure staggering strategy, as described, for example, in above-referenced U.S. patent application Ser. No. 11/116,543, each of these 7 beacons will be transmitted a period of 140/7=20 ms apart.

DTIM beacon occurrences will be staggered as follows:

B(1) D(2) B(3) D(4) B(5) D(6) B(7) . . . D(1) B(2) D(3) B(4) D(5) B(6) D(7) . . .

Consider now the pure bursting strategy. In this case, all of the beacons are transmitted at the start of the beacon period, with the time between each beacon being the IEEE802.11 MAC protocol SIFS time. DTIMs for these BSSs occur simultaneously, every other beacon:

B(1)B(2)B(3)B(4)B(5)B(6)B(7) . . . D(1)D(2)D(3)D(4)D(5)D(6)D(7) . . . .

A first embodiment of the invention uses a combination of staggering and bursting, splitting the 7 (in general, Num_BSSID) beacons into multiple, e.g., $N_s$ bursts of pluralities $n_1$, $n_2$, . . . , $n_{N_s}$ of beacons, with $n_1+n_2+ \ldots +n_{N_s}$=Num_BSSID. As an example, with Num_BSSID=7, suppose there are three bursts ($N_s$=3): two bursts of two beacons, and one of three beacons, e.g., $n_1$=2, $n_2$=2, and $n_3$=3. Using the staggering strategy, as described, for example, in above-referenced U.S. patent application Ser. No. 11/116,543 to stagger the DTIM offsets, the device 111 includes transmitting the sequence:

B(1)B(2) . . . D(3)D(4) . . . B(5)B(6)B(7) . . . D(1)D(2) . . . B(3)B(4) . . . D(5)D(6)D(7) . . . .

In this example, bursting beacons 2 or 3 at a time provides reduced medium contention time, while still maintaining airtime between the beacon bursts to allow for buffered multicast traffic when power save clients are associated with one or more of the plurality of BSSs implemented in device 111.

Staggering in More Detail

The staggering strategy in above-referenced U.S. patent application Ser. No. 11/116,543 to stagger the DTIM offsets, applied in the present invention to the bursts, is now described in more detail. The method for determining the TSF offsets for given beacons to ensure that it is relatively unlikely that there are back-to-back DTIM beacons transmitted by the multiple BSSID wireless device. One method embodiment provides, for a fixed value DTIM count, that the DTIM beacons are spread substantially evenly, interleaved with non-DTIM beacons, across the time period between successive DTIM beacons of any one of the plurality of BSSIDs supported by the wireless device. The method includes calculating for each BSSID a TSF offset using system parameters such as the DTIM count, the beacon period, the inter-beacon spacing, and values derived from these system parameters. The method is a piecemeal function, which calculates the TSF offset for a given BSSID number based on the input parameters. Different equations are used to calculate the TSF offset based on the relationship between the DTIM period and the number of BSSIDs in the system.

Denote the beacon period by Period_beacon. That is, for any BSSID, a beacon is sent every Period_beacon. Denote by Num_BSSID the number of BSSIDs enabled (configured) on the wireless device. Denote the DTIM period by Period_DTIM. That is, for any BSSID, a DTIM beacon is sent every Period_DTIM. Define as the delta beacon time, denoted by delta_b, the time between beacons of any of the BSSIDs on the wireless device. Thus, delta_b is the beacon period divided by the number of BSSIDs, Num_BSSID. That is, Delta_b=Period_beacon/Num_BSSID.

One method embodiment described in above-referenced U.S. patent application Ser. No. 11/116,543 includes an initialization as follows:

```
If Period_DTIM < Num_BSSID, then p_1=Num_BSSID
Else, if Period_DTIM = Num_BSSID, then p_1=Period_DTIM,
  except, if Period_DTIM>2, p_1=Period_DTIM-1, or
  if Period_DTIM>6, p_1=Period_DTIM-2, or
  if Period_DTIM>7, p_1=Period_DTIM-3.
Else, if Period_DTIM > Num_BSSID, then p_1=Period_DTIM
```

Define phase_multiplier as the DTIM period (an integer) divided by the BSSID count Num_BSSID. That is, phase_multiplier=Period_DTIM/Num_BSSID.

If phase_multiplier=0, then let phase_multiplier=1.

That is, phase_multiplier=max(1, integer(Period_DTIM/Num_BSSID)).

Denote the present BSSID by i.

For each BSSID i configured in the system,

If the DTIM period Period_DTIM=Num_BSSID, or if Period_DTIM=Num_BSSID−1, then set the TSF offset for BSSID i, denoted TSF_offset_i as

```
TSF_offset_i = (delta_b * i) +
  ((Period_DTIM-i) * (Period_beacon*phase_multiplier)).
Else, if the Period_DTIM = 1, then
  TSF_offset_i = i * delta_b.
```

Else, in all other case, i.e., if Period_DTIM≠Num_BSSID, and if Period_DTIM≠Num_BSSID−1 and if Period_DTIM≠1, then set the TSF offset for BSSID i as

```
TSF_offset_i = ((i mod p_1) * delta_b) +
  (i * phase_multiplier ★ Period_beacon) .
```

This staggering method, as described above and in referenced U.S. patent application Ser. No. 11/116,543, is for staggering all beacons, and has been found to sufficiently ensure that two DTIM beacons are not transmitted in succession, i.e., back to back. This in turn ensures that there is time to broadcast/multicast the data buffered immediately after a DTIM beacon is transmitted.

When applied to the present invention, this method is modified to bursts of beacon frames, rather than individual beacon frames.

Weighting the Inter-Burst Times

Another aspect of the invention includes weighting the times between staggered bursts of beacons according to one or more criteria. One embodiment includes weighting the times between staggered bursts of beacons according to the number of beacons in the burst such that bursts of more beacons are provided with more free air-time after each such larger burst than after bursts of fewer beacons. With bursts of more beacons, there is a likelihood and potential for more multicast traffic to be buffered for power save clients of the corresponding BSSIDs. As an example, for the seven beacons arranged as burst of 2, 2, and 3 beacons, as described above, the timing is, assuming no overhead time for transmitting the beacons:

B(1)B(2)<40 ms>D(3)D(4)<40 ms>B(5)B(6)B(7)<60 ms>

D(1)D(2)<40 ms>B(3)B(4)<40 ms> . . .

Yet another aspect of the invention includes grouping the beacons into bursts of beacons according to the priority of traffic in the BSSs corresponding to the beacons, that is, grouping according to the traffic priority in the APs transmitting the beacons, such that all beacons of any burst are of APs for the same traffic priority, and further weighting the bursts according to the relative priority, e.g., multicast priority of the traffic of the BSSs of (so of the APs sending) the beacons in the burst.

Yet another aspect includes weighting according to both the number of beacons in a burst, and according to the relative multicast priority of the traffic in the BSSs corresponding to the beacons of the burst.

As an example, suppose some of the APs of the device 111 are for time sensitive client wireless devices, e.g., for VOIP clients. The beacons for the VoIP clients are grouped into one or more bursts with a higher multicast priority level than other wireless network traffic. According to the above-described aspect of the invention, the one or more beacon bursts for this set of VoIP BSSs are given more time after the burst to allow all buffered multicast traffic to be transmitted without contending with other beacon bursts. Furthermore, the time after a burst is also weighted according to the number of beacons in the burst. On the other hand, suppose it is known that multicast filtering is carried out for some BSSs, e.g., at the wireless device 111, or at the switch 103. The beacon traffic of such BSSs is grouped together into bursts of beacons, and given a lower multicast priority. The time provided for multicast traffic for the given BSSs only needs to be short, so the weighting for such bursts of (pre-filtered) beacons is reduced to allow other BSSs more buffered multicast transmit time.

Yet another aspect of combining staggering and bursting of beacons includes grouping according the DTIM values, that is, each burst includes beacons that have the same DTIM value. By so grouping beacons for bursting, this aspect of the invention provides for the sharing of resources on the multiple BSSID AP, e.g., device 111. As an example, typically, in a wireless device that supports a plurality of APs, a queue of deferred multicast traffic is maintained for each BSS. By grouping according to DTIM, only a single deferred multicast traffic queue needs to be maintained per burst of beacons, rather than a deferred multicast traffic queue needing to be maintained per BSS.

Determining Beacon Grouping and Burst Times

Figure 3:
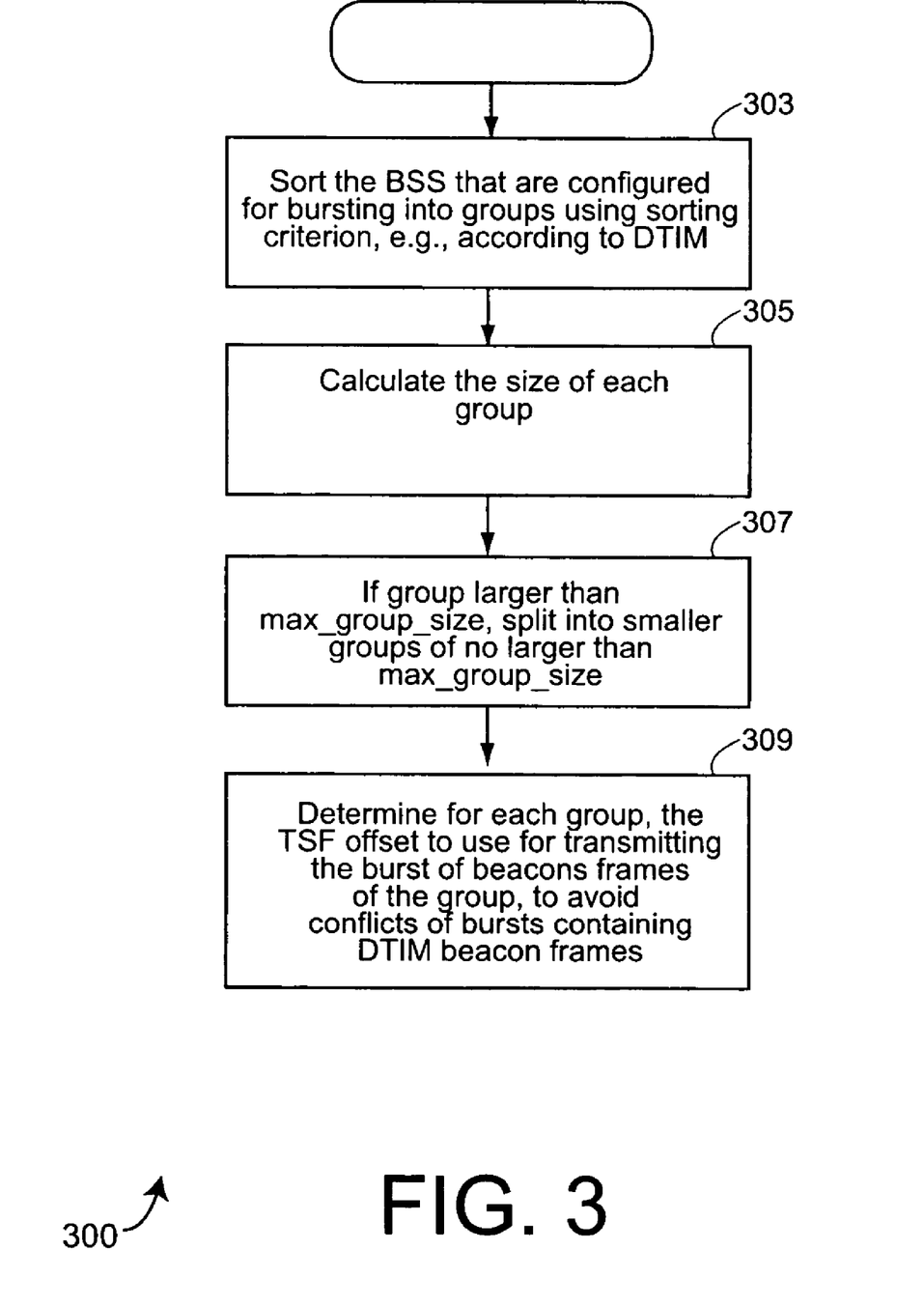
FIG. 3 shows a flowchart of one embodiment of a method of determining the grouping of BSSs according to a grouping criterion, in this example, grouping according to DTIM.

In one embodiment, software, e.g., in 223 (FIG. 2) in the wireless device 111 causes the processor 217 to determine the beacon grouping. FIG. 3 shows a simplified flowchart of one method 300 of determining grouping of the beacon frames, e.g., for the grouping according to the DTIM case. How to modify the method to other grouping criteria would be clear to those in the art. The method 300 includes:

In 303, sorting the BSS that are configured for bursting operation, with the sorting using a sorting criterion. In one embodiment, a bubble sort is used to order the BSSs based on their DTIM period. This results in groups, each group having the same DTIM.

305 includes calculating the size of each group of DTIMs in the burst. The group size can be used to split any large DTIM burst of beacons into a plurality of smaller groups of beacon bursts.

Thus 307 includes, for each unique DTIM count in the ordered set of BSSs, splitting any groups of larger than a preset number of BSSs into smaller groups. In one embodiment, the pre-set number is 4. Note that the beacon bursts don't have to have equal group sizes. In the embodiment that includes share queue resources, the beacon bursts typically do not have equal group sizes.

As a result of 307, there are four or less BSSs within each beacon burst.

In 309, for each value of DTIM, in the case there is more than one beacon burst, a TSF offset is determined to prevent the beacon bursts from occurring in succession. In one embodiment, the method described in above-referenced U.S. patent application Ser. No. 11/116,543 is used to stagger the beacon bursts within the beacon period, ensuring we don't get the situation of two beacon bursts with the same DTIM occurring consecutively. In general, a method embodiment provides, for a group of bursts having a fixed value DTIM count, that the DTIM beacon bursts are spread substantially evenly, interleaved with non-DTIM beacons or beacon bursts, across the time period between successive DTIM beacon bursts. As described in above-referenced U.S. patent application Ser. No. 11/116,543, the method includes calculating for each burst a TSF offset using system parameters such as the DTIM value, the beacon period, the inter-beacon burst spacing, and values derived from these system parameters. The method is a piecemeal function, which calculates the TSF offset for a given burst of beacons for a given DTIM based on the input parameters. Different equations are used to calculate the TSF offset based on the relationship between the DTIM period and the number of beacons in each burst.

One version of how the TSF offset is determined in above-referenced U.S. patent application Ser. No. 11/116,543 is described in above under "The staggering in more detail."

Thus, 309 includes preventing conflicts for beacon bursts of BSSs with the same DTIM period.

In one version of 309, extra weighting is taken into account in determining the TSF offset for the inter-burst gap to increase or decrease according to a weighting criterion.

In more detail, for the following description, suppose k denotes which group of the total number of groups for any particular DTIM (for the DTIM-based embodiment). Let Num_beacons(n) denote the number of beacons in the n'th beacon burst within group k. To calculate the offset, denoted Offset(n) within the beacon period, denoted Period_beacon, for beacon burst n, one embodiment uses a method that follows the following pseudocode.

Let cumul=0
for each value of n in the beacon burst group k, repeat $$\text{offset}(n) = \text{Period\_beacon} - ((\text{cumul} * \text{Period\_beacon})) / \text{Num\_BSSID})$$
$$\text{cumul} = \text{cumul} + \text{Num\_beacons}(n).$$

In the case that extra weighting per-burst is used, that is, that the time between bursts is weighted, to calculate the offset Offset(n) for the beacon burst n, in this case, one embodiment uses a method that follows the following pseudocode, in which again k denotes the group of beacon bursts of the total number of groups, e.g., for a particular DTIM. In addition, let W(n) denote the relative weight, e.g., as a percentage, of the beacon burst across the entire beacon period Period_beacon for the n'th burst, and suppose W(n)>1 for all n, with $\Sigma_n$ W(n)=100 for each group k of beacons bursts. If, for example, for any DTIM, there are four groups of bursts, then $\Sigma_k \Sigma_n$ W(n)=400.

As above, let Num_beacons(n) denote the count of beacons in burst n within group k. To calculate the offset, denoted offset(n) for the beacon period for beacon burst n, one embodiment uses the following pseudocode.

Let cumul=0
for each n in group k of beacon bursts, repeat:

$$\text{offset}(n) = \text{Period\_beacon}$$
$$\qquad - (((\text{cumul} * \text{Period\_beacon})/100)/\text{Num\_BSSID})$$
$$\text{cumul} = \text{cumul} + (\text{Num\_beacons}(n) * W(n))$$

where * denoted multiplication.

Applying the extra offset as calculated above prevents DTIM periods of DTIM-similar beacon burst groups happening in quick succession.

It should be noted that the above two methods for which pseudocode is provided are by no means, or implied to be the only way of calculating the weighted offsets of the beacon bursts. Those skilled in the art could easily extend the weighting equations to cover different situations and different applications running on the wireless network. The scope of the present invention is not restricted to any particular way of calculating the offsets, and not only for DTIM similar bursts.

Figure 4:
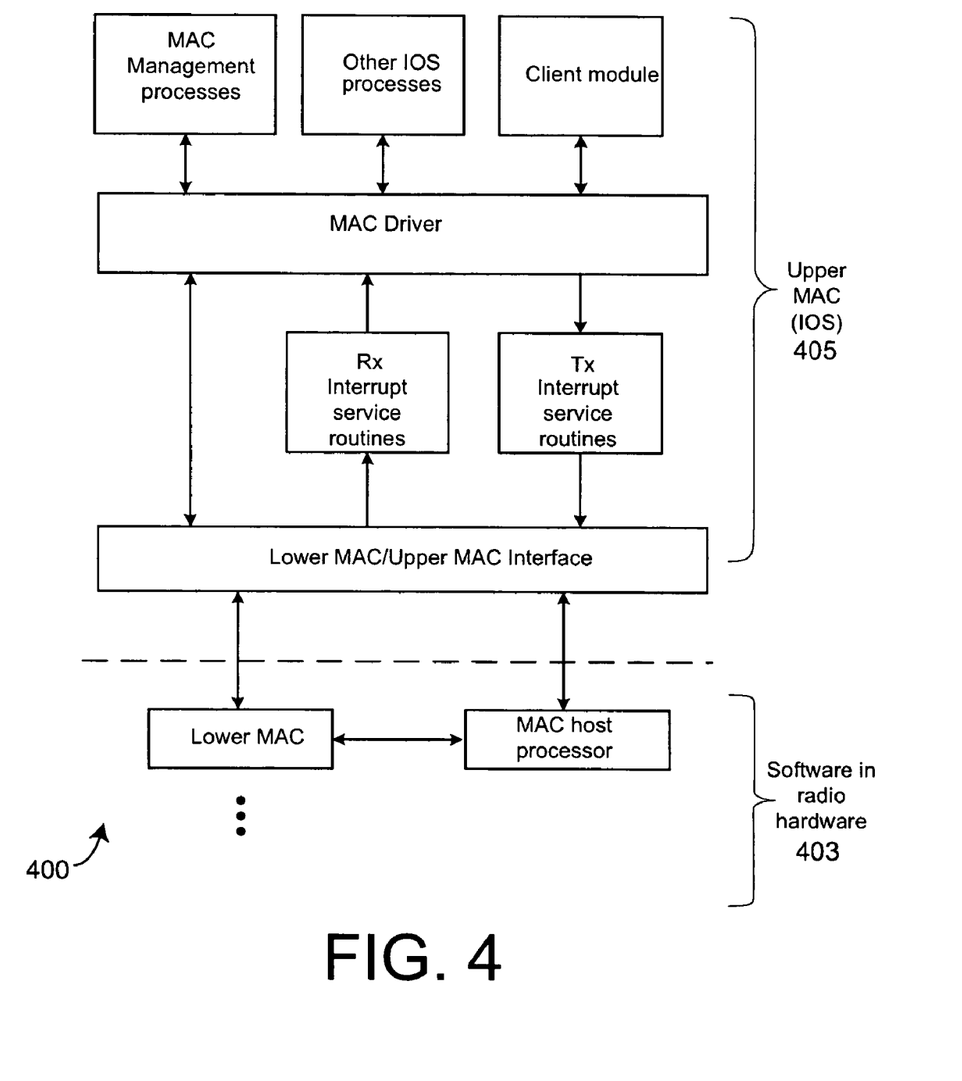
FIG. 4 shows in simplified block diagram form one embodiment of a software architecture for the wireless device shown in FIG. 2 that includes an implementation of one or more aspects of the present invention.

FIG. 4 shows one embodiment 400 of a software architecture for the wireless device shown in FIG. 2. The tasks are split between the switch 103, with software 405 operating on the switch host processor 123, e.g., under IOS, the operating systems used in switches made by Cisco Systems, Inc., San Jose, Calif., related to the assignee of the present invention, and software 403 operating in the wireless device hardware 203, in particular, the wireless device hardware's host processor 217 and the lower MAC hardware 209. MAC functions occur as interrupt routines that operate under IOS.

In one embodiment the layering of the method of FIG. 4 includes the following tasks carried out under IOS in the switch:

Configuring of the DTIM period for each of the BSSIDs supported.

Configuring the beacon period for each of the BSSIDs supported.

Calculating the inter-beacon period.

Implementing the method of FIG. 3 based on the configured parameters.

Packaging for transmission to the radio of DTIM data such as the TSF offset and DTIM period for each BSSID.

Passing the packaged DTIM data inline to the wireless device hardware 203 with the data for the beacon frame to be transmitted in the DTIM beacon for each such BSSID.

The tasks carried out by software 403 in the wireless device hardware 203 include:

Ascertaining for the particular BSSID based on the TSF offset and the current TSF time $TSF_{local}$, whether a beacon is a DTIM beacon or normal beacon, and transmitting the beacon for the particular BSSID as either a DTIM or a normal beacon.

One embodiment of the wireless device shown in FIG. 2 provides for up to 16 BSSIDs, i.e., different simultaneous MAC addresses on the wireless device when the wireless device acts as one or more APs. Another allows for up to 64 BSSIDs on the wireless device when the wireless device acts as one or more APs.

Thus has been described a method, an apparatus, and a software program, that is, instructions carried on a computer-readable carrier medium to instruct a processor to implement a method. The method is to provide for grouping and weighting beacon bursts in a wireless device having a plurality of WLAN MAC addresses (BSSIDs).

It should be appreciated that although the invention has been described in the context of the IEEE 802.11 standard, the invention is not limited to such contexts and may be utilized in various other applications and systems, including, for example other WLAN standards and other wireless standards. Applications that can be accommodated include IEEE 802.11 wireless LANs and links, wireless Ethernet, HIPER-LAN 2, European Technical Standards Institute (ETSI) broadband radio access network (BRAN), and multimedia mobile access communication (MMAC) systems, wireless local area networks, local multipoint distribution service (LMDS) IF strips, TDMA packet radios, and so forth.

In the general case, the invention is applicable to a method in a wireless device that supports a plurality access points each supporting a network identifier of a plurality of network identifiers. When each access point of the wireless device substantially conform to the IEEE 802.11 standard, the plurality of network identifiers is a plurality of BSSIDs, wherein for a particular BSSID and the device acting as a particular access point for the particular BSSID. In the general case, the device transmits a management frame that includes a broadcast-buffered indication. In one embodiment for the IEEE 802.11 standard, the management frame containing a broadcast-buffered indication is a beacon frame that includes a DTIM, and the other management frame broadcast by the particular access point of the particular BSSID is a management frame that includes a TIM but not a DTIM. In the general case, there is a provided time period that indicates the time between transmissions of frames that contains a broadcast-buffered indication. In one IEEE 802.11 standard embodiment, this provided time period is the DTIM period.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulates and/or transforms data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computer" or a "computing machine" or a "computing platform" may include one or more processors.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a wireless device that can act as a plurality of "virtual" APs, i.e., a wireless device that can support multiple MAC addresses, e.g., as multiple BSSIDs of infrastructure networks. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

"Variants of the IEEE 802.11 standard" as used herein means the variants and proposed variants of the IEEE 802.11 standard. Variants are versions defined in clauses of the standard and proposed amendments of the standard.

While one embodiment of the receiver (FIG. 2) operates by splitting MAC tasks between a switch and a wireless device, other embodiments are possible, e.g., in which more of the tasks occur at the wireless device.

All publications, patents, and patent applications cited herein are hereby incorporated by reference.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method in a wireless device of a wireless network, the wireless network providing for access points to transmit management frames, including management frames that contain a broadcast-buffered indication to indicate that there is broadcast or multicast traffic buffered in the access point transmitting the management frame, the wireless device supports a plurality of network identifiers so that the device can act as a plurality of access points in the wireless network, the method comprising:

transmitting bursts of management frames, each burst including a plurality of management frames for a corresponding subset of network identifiers of the wireless device that are active in the wireless device, transmitting each burst of the management frames being the transmitting of the plurality of management frames included in the burst in rapid succession to each other, each burst either being of management frames each containing a broadcast-buffered indication for a corresponding network identifier that is active in the wireless device, or being of management frames not containing any broadcast-buffered indication, the number of management frames in each burst being less than the number of network identifiers active in the wireless device, such that during the time between successive transmissions of bursts of management frames containing a broadcast-buffered indication for a particular network identifier, at least one management frame is transmitted for each of the network identifiers that are active in the wireless device, the at least one management frame for each of the network identifiers comprising a single management frame that includes a broadcast buffered indication for each of the network identifiers active in the wireless device, and such that during the time between successive transmissions of management frames containing a broadcast-buffered indication for the particular network identifier, the transmission times of the bursts of management frames that contain a broadcast-buffered indication for their respective network identifier are spread interleaved with the transmitting times of the bursts of management frames not containing any broadcast-buffered indication for their respective network identifiers, wherein a burst of management frames not containing any broadcast-buffered indication is interleaved between any two successive bursts of management frames containing a broadcast-buffered indication, and wherein the time intervals between bursts of management frames containing a broadcast-buffered indication are spread evenly or are spread by amounts weighted according to one or more weighting criteria.

2. A method as recited in claim 1, wherein the wireless device includes a local synchronization clock, the method comprising:

determining for each burst and each management frame in the burst, a time offset to use with the local synchronization clock for the time for transmitting the management frames in the burst of management frames containing a broadcast-buffered indication, the determining using one or more of a set of system parameters that includes the number of network identifiers active in the device, the number of bursts, the number of management frames in each burst, a provided time period that indicates for each burst the time between transmissions of management frames that includes a broadcast-buffered indication, and a provided time period that indicates the time between transmissions of the other management frames by the access point of the network identifier.

3. A method as recited in claim 1, wherein the plurality of network identifiers is a plurality of BSSIDs, wherein for a particular BSSID and the device acting as a particular access point for the particular BSSID, the management frame that includes a broadcast-buffered indication is a beacon frame that includes a DTIM, and the other management frame broadcast by the particular access point of the particular BSSID is a management frame that includes a TIM but not a DTIM, wherein the provided time period that indicates the time between transmissions of frames that includes a broadcast-buffered indication is the DTIM period, and wherein the provided time period that indicates the time between transmissions of the other frames is the management frame period for the access points supported by the wireless device.

4. A method as recited in claim 2, wherein the wireless device is coupled to a network device that includes a processor, and wherein the determining of the time offset is by the processor of the network device, the method further comprising:

accepting at the wireless device the determined time offsets for each BSSID supported by the wireless device, transmitting the management frames containing a broadcast-buffered indication according to the determined time offsets and the local synchronization clock, and transmitting the other frames.

5. A method as recited in claim 4, wherein the network device includes a switch.

6. A method as recited in claim 2, wherein the determining of the time offset is at the wireless device, the method further comprising:

transmitting the management frames containing a broadcast-buffered indication according to the determined time offsets and the local synchronization clock, and transmitting the other frames.

7. A method as recited in claim 1, wherein the bursts of management frames containing a broadcast-buffered indication are spread evenly, interleaved with the bursts of management frames not containing any broadcast-buffered indication.

8. A method as recited in claim 1, wherein the time interval between bursts of management frames containing a broadcast-buffered indication are spread by amounts weighted according to one or more weighting criteria.

9. A method as recited in claim 8, wherein one weighting criterion is such that the times between staggered bursts of management frames are weighted according to the number of management frames in the immediately preceding burst such that bursts of a relatively large number of management frames are provided with more air-time after each such relatively large burst than after bursts of a relatively small number of management frames.

10. A method as recited in claim 8, wherein management frames are grouped according to the priority of traffic in the access points transmitting the management frame, such that all management frames of any burst are of access points for the same traffic priority, and wherein one weighting criterion is such that the times between staggered bursts of management frames are weighted according to the priority of the traffic of the access points sending the management frames, such that bursts of management frames of relatively high priority traffic access points are provided with more air-time per management frame after each such burst than after bursts of management frames of relatively low priority traffic access points.

11. A method as recited in claim 10, wherein another weighting criterion is such that the times between staggered bursts of management frames are additionally weighted according to the number of management frames in the immediately preceding burst such that for the same multicast priority, bursts of a relatively large number of management frames are provided with more air-time after each such relatively large burst than after bursts of a relatively small number of management frames.

12. A method as recited in claim 1, wherein the bursts have a pre-defined maximum number of management frames.

13. A method as recited in claim 1, wherein management frames that contain a broadcast-buffered indication and that are in the same burst have the same provided time period that indicates the time between transmissions of management frames containing a broadcast-buffered indication.

14. A method as recited in claim 13, wherein the bursts of management frames containing a broadcast-buffered indication are spread evenly, interleaved with the bursts of management frames not containing any broadcast-buffered indication.

15. A method of transmitting a plurality of management frames for a corresponding plurality of network identifiers of a wireless network, the method being in a wireless device that supports the plurality of network identifiers and acting as an access point for each of the plurality of network identifiers, the wireless device being in the wireless network and including a transmitter, the method comprising:

transmitting staggered bursts of pluralities of management frames for corresponding subsets of the network identifiers, transmitting each burst of the management frames being the transmitting of the plurality of management frames included in the burst in rapid succession to each other, the transmitting including, for all subsets of the network identifiers:

transmitting a burst of management frames, each particular management frame in the burst including a broadcast-buffered indication indicating that there is broadcast or multicast traffic buffered in the access point of the network identifier of the particular management frame, wherein the bursts of management frames containing a broadcast-buffered indication are transmitted by the wireless device at times spread evenly, interleaved with bursts of other management frames not containing any broadcast-buffered indication, wherein a burst of management frames not containing any broadcast-buffered indication is interleaved between any two successive bursts of management frames containing a broadcast-buffered indication, wherein each burst includes fewer management frames than there are network identifiers active in the wireless device.

16. A non transitory computer-readable storage medium configured with instructions that, when executed by one or more processors of a processing system, cause a wireless device of a wireless network to carry out a method, the wireless network providing for access points to transmit management frames, including management frames that contain a broadcast-buffered indication to indicate that there is broadcast or multicast traffic buffered in the access point transmitting the management frame, the wireless device supports a plurality of network identifiers so that the device can act as a plurality of access points in the wireless network, the method comprising:

transmitting bursts of management frames, each burst including a plurality of management frames for a corresponding subset of network identifiers of the wireless device that are active in the wireless device, transmitting each burst of the management frames being the transmitting of the plurality of management frames included in the burst in rapid succession to each other, each burst either being of management frames each containing a broadcast-buffered indication for a corresponding network identifier that is active in the wireless device, or being of management frames not containing any broadcast-buffered indication, the number of management frames in each burst being less than the number of network identifiers active in the wireless device, such that during the time between successive transmissions of bursts of management frames containing a broadcast-buffered indication for a particular network identifier, at least one management frame is transmitted for each of the network identifiers that are active in the wireless device, the at least one management frame for each of the network identifiers comprising a single management frame that includes a broadcast buffered indication for each of the network identifiers active in the wireless device, and such that during the time between successive transmissions of management frames containing a broadcast-buffered indication for the particular network identifier, the transmission times of the bursts of management frames that contain a broadcast-buffered indication for their respective network identifier are spread interleaved with the transmitting times of the bursts of management frames not containing any broadcast-buffered indication for their respective network identifiers,.

wherein a burst of management frames not containing any broadcast-buffered indication is interleaved between any two successive bursts of management frames containing a broadcast-buffered indication, and wherein the time intervals between bursts of management frames containing a broadcast-buffered indication are spread evenly or are spread by amounts weighted according to one or more weighting criteria.

17. A non-transitory computer-readable storage medium as recited in claim 16, wherein the wireless device includes a local synchronization clock, and wherein the method further comprises:

determining for each burst and each management frame in the burst, a time offset to use with the local synchronization clock for the time for transmitting the management frames in the burst of management frames containing a broadcast-buffered indication, the determining using one or more of a set of system parameters that includes the number of network identifiers active in the device, the number of bursts, the number of management frames in each burst, a provided time period that indicates for each burst the time between transmissions of management frames that includes a broadcast-buffered indication, and a provided time period that indicates the time between transmissions of the other management frames by the access point of the network identifier.

18. A non-transitory computer-readable storage medium as recited in claim 16, wherein the plurality of network identifiers is a plurality of BSSIDs, wherein for a particular BSSID and the device acting as a particular access point for the particular BSSID, the management frame that includes a broadcast-buffered indication is a beacon frame that includes a DTIM, and the other management frame broadcast by the particular access point of the particular BSSID is a management frame that includes a TIM but not a DTIM, wherein the provided time period that indicates the time between transmissions of frames that includes a broadcast-buffered indication is the DTIM period, and wherein the provided time period that indicates the time between transmissions of the other frames is the management frame period for the access points supported by the wireless device.

19. A non-transitory computer-readable storage medium as recited in claim 17, wherein the wireless is coupled to a network device that includes a network device processor, and wherein the determining of the time offset is by the network device processor of the network device, and wherein the method further comprises:

accepting at the wireless device the determined time offsets for each BSSID supported by the wireless device, transmitting the management frames containing a broadcast-buffered indication according to the determined time offsets and the local synchronization clock, and transmitting the other frames.

20. A non-transitory computer-readable storage medium as recited in claim 17, wherein the determining of the time offset is at the wireless device, and wherein the method further comprises:

transmitting the management frames containing a broadcast-buffered indication according to the determined time offsets and the local synchronization clock, and transmitting the other frames.

21. A non-transitory computer-readable storage medium as recited in claim 16, wherein the bursts of management frames containing a broadcast-buffered indication are spread evenly, interleaved with the bursts of management frames not containing any broadcast-buffered indication.

22. A non-transitory computer-readable storage medium as recited in claim 16, wherein the time interval between bursts of management frames containing a broadcast-buffered indication are spread by amounts weighted according to one or more weighting criteria.

23. A non-transitory computer-readable storage medium as recited in claim 22, wherein one weighting criterion is such that the times between staggered bursts of management frames are weighted according to the number of management frames in the immediately preceding burst such that bursts of a relatively large number of management frames are provided with more air-time after each such relatively large burst than after bursts of a relatively small number of management frames.

24. A non-transitory computer-readable storage medium as recited in claim 22, wherein management frames are grouped according to the priority of traffic in the access points transmitting the management frame, such that all management frames of any burst are of access points for the same traffic priority, and wherein one weighting criterion is such that the times between staggered bursts of management frames are weighted according to the priority of the traffic of the access points sending the management frames, such that bursts of management frames of relatively high priority traffic access points are provided with more air-time per management frame after each such burst than after bursts of management frames of relatively low priority traffic access points.

25. A non-transitory computer-readable storage medium as recited in claim 24, wherein another weighting criterion is such that the times between staggered bursts of management frames are additionally weighted according to the number of management frames in the immediately preceding burst such that for the same multicast priority, bursts of a relatively large number of management frames are provided with more air-time after each such relatively large burst than after bursts of a relatively small number of management frames.

26. A non-transitory computer-readable storage medium as recited in claim 16, wherein the bursts have a pre-defined maximum number of management frames.

27. A non-transitory computer-readable storage medium as recited in claim 16, wherein management frames that contain a broadcast-buffered indication and that are in the same burst have the same provided time period that indicates the time between transmissions of management frames containing a broadcast-buffered indication.

28. A non-transitory computer-readable storage medium as recited in claim 27, wherein the bursts of management frames containing a broadcast-buffered indication are spread evenly, interleaved with the bursts of management frames not containing any broadcast-buffered indication.

29. An apparatus in a wireless device of a wireless network, the wireless network providing for access points to transmit management frames, including management frames that contain a broadcast-buffered indication to indicate that there is broadcast or multicast traffic buffered in the access point transmitting the management frame, the wireless device supports a plurality of network identifiers so that the device can act as a plurality of access points in the wireless network, the apparatus comprising:
  means for transmitting,
    wherein the means for transmitting is arranged to transmit bursts of management frames, each burst including a plurality of management frames for a corresponding subset of network identifiers of the wireless device, transmitting each burst of the management frames being the transmitting of the plurality of management frames included in the burst in rapid succession to each other, each burst either being of management frames each containing a broadcast-buffered indication for a corresponding network identifier that is active in the wireless device, or being of management frames not containing any broadcast-buffered indication,
    the number of management frames in each burst being less than the number of network identifiers active in the wireless device
    such that during the time between successive transmissions of bursts of management frames containing a broadcast-buffered indication for a particular network identifier, at least one management frame is transmitted for each of the network identifiers that are active in the wireless device, the at least one management frame for each of the network identifiers comprising a single management frame that includes a broadcast buffered indication for each of the network identifiers active in the wireless device, and
    such that during the time between successive transmissions of management frames containing a broadcast-buffered indication for the particular network identifier, the transmission times of the bursts of management frames that contain a broadcast-buffered indication for their respective network identifier are spread interleaved with the transmitting times of the bursts of management frames not containing any broadcast-buffered indication, for their respective network identifiers,
    wherein a burst of management frames not containing any broadcast-buffered indication is interleaved between any two successive bursts of management frames containing a broadcast-buffered indication, and
    wherein the time intervals between bursts of management frames containing a broadcast-buffered indication are spread evenly or are spread by amounts weighted according to one or more weighting criteria.

30. An apparatus as recited in claim 29, further comprising:
  a local synchronization clock, and
  means for determining for each burst and each management frame in the burst, a time offset to use with the local synchronization clock for the time for transmitting the management frames in the burst of management frames containing a broadcast-buffered indication, the means for determining using one or more of a set of system parameters that includes the number of network identifiers active in the device, the number of bursts, the number of management frames in each burst, a provided time period that indicates for each burst the time between transmissions of management frames that includes a broadcast-buffered indication, and a provided time period that indicates the time between transmissions of the other management frames by the access point of the network identifier.

31. An apparatus as recited in claim 29, wherein the bursts of management frames containing a broadcast-buffered indication are spread evenly, interleaved with the bursts of management frames not containing any broadcast-buffered indication.

32. An apparatus as recited in claim 29, wherein the time interval between bursts of management frames containing a broadcast-buffered indication are spread by amounts weighted according to one or more weighting criteria.

33. An apparatus as recited in claim 32, wherein one weighting criterion is such that the times between staggered bursts of management frames are weighted according to the number of management frames in the immediately preceding burst such that bursts of a relatively large number of management frames are provided with more air-time after each such relatively large burst than after bursts of a relatively small number of management frames.

34. An apparatus as recited in claim 32, wherein management frames are grouped according to the priority of traffic in the access points transmitting the management frame, such that all management frames of any burst are of access points for the same traffic priority, and wherein one weighting criterion is such that the times between staggered bursts of management frames are weighted according to the priority of the traffic of the access points sending the management frames, such that bursts of management frames of relatively high priority traffic access points are provided with more air-time per management frame after each such burst than after bursts of management frames of relatively low priority traffic access points.

35. An apparatus as recited in claim 34, wherein another weighting criterion is such that the times between staggered bursts of management frames are additionally weighted according to the number of management frames in the immediately preceding burst such that for the same multicast priority, bursts of a relatively large number of management frames are provided with more air-time after each such relatively large burst than after bursts of a relatively small number of management frames.

36. An apparatus in a wireless device of a wireless network, the wireless network providing for access points to transmit management frames, including management frames that contain a broadcast-buffered indication to indicate that there is broadcast or multicast traffic buffered in the access point transmitting the management frame, the wireless device supports a plurality of network identifiers so that the device can act as a plurality of access points in the wireless network, the apparatus comprising:
  a transceiver; and
  control logic coupled to the transceiver,
    wherein the control logic is arranged to cause the transceiver to transmit bursts of management frames, each frame burst including a plurality of management frames for a corresponding subset of network identifiers of the wireless device that are active in the wireless device, transmitting each burst of the management frames being the transmitting of the plurality of management frames included in the burst in rapid succession to each other, each burst either being of management frames each containing a broadcast-buffered indication for a corresponding network identifier that is active in the wireless device, or being of management frames not containing any broadcast-buffered indication, the number of management frames in each burst being less than the number of network identifiers active in the wireless device, such that during the time between successive transmissions of bursts of management frames containing a broadcast-buffered indication for a particular network identifier, at least one management frame is transmitted for each of the network identifiers that are active in the wireless device, the at least one management frame for each of the network identifiers comprising a single management frame that includes a broadcast buffered indication for each of the network identifiers active in the wireless device, and such that during the time between successive transmissions of management frames containing a broadcast-buffered indication for the particular network identifier, the transmission times of the bursts of management frames that contain a broadcast-buffered indication for their respective network identifier are spread interleaved with the transmitting times of the bursts of management frames not containing any broadcast-buffered indication, for their respective network identifiers, wherein a burst of management frames not containing any broadcast-buffered indication is interleaved between any two successive bursts of management frames containing a broadcast-buffered indication, and wherein the time intervals between bursts of management frames containing a broadcast-buffered indication are spread evenly or are spread by amounts weighted according to one or more weighting criteria.

37. An apparatus as recited in claim 36, further comprising:

a local synchronization clock coupled to the control logic, wherein the control logic is arranged to determine for each burst and each management frame in the burst, a time offset to use with the local synchronization clock for the time for transmitting the management frames in the burst of management frames containing a broadcast-buffered indication, the means for determining using one or more of a set of system parameters that includes the number of network identifiers active in the device, the number of bursts, the number of management frames in each burst, a provided time period that indicates for each burst the time between transmissions of management frames that includes a broadcast-buffered indication, and a provided time period that indicates the time between transmissions of the other management frames by the access point of the network identifier.

* * * * *

UNITED STATES PATENT AND TRADEMARK OFFICE
CERTIFICATE OF CORRECTION

| | | |
|---|---|---|
| PATENT NO. | : 8,184,564 B2 | |
| APPLICATION NO. | : 11/356611 | |
| DATED | : May 22, 2012 | |
| INVENTOR(S) | : Kinder et al. | |

It is certified that error appears in the above-identified patent and that said Letters Patent is hereby corrected as shown below:

In Column 22, line 4, after "wireless", kindly insert --device--.

Signed and Sealed this
Eleventh Day of September, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,184,564 B2 | Page 1 of 1 |
| APPLICATION NO. | : 11/356611 | |
| DATED | : May 22, 2012 | |
| INVENTOR(S) | : Kinder et al. | |

It is certified that error appears in the above-identified patent and that said Letters Patent is hereby corrected as shown below:

In the Specification:

In Column 8, line 42, after "and", kindly replace "DESCRIPTION" with --DECRYPTION--.

Signed and Sealed this
Fourth Day of June, 2013

Teresa Stanek Rea
*Acting Director of the United States Patent and Trademark Office*